Patented Apr. 10, 1928.

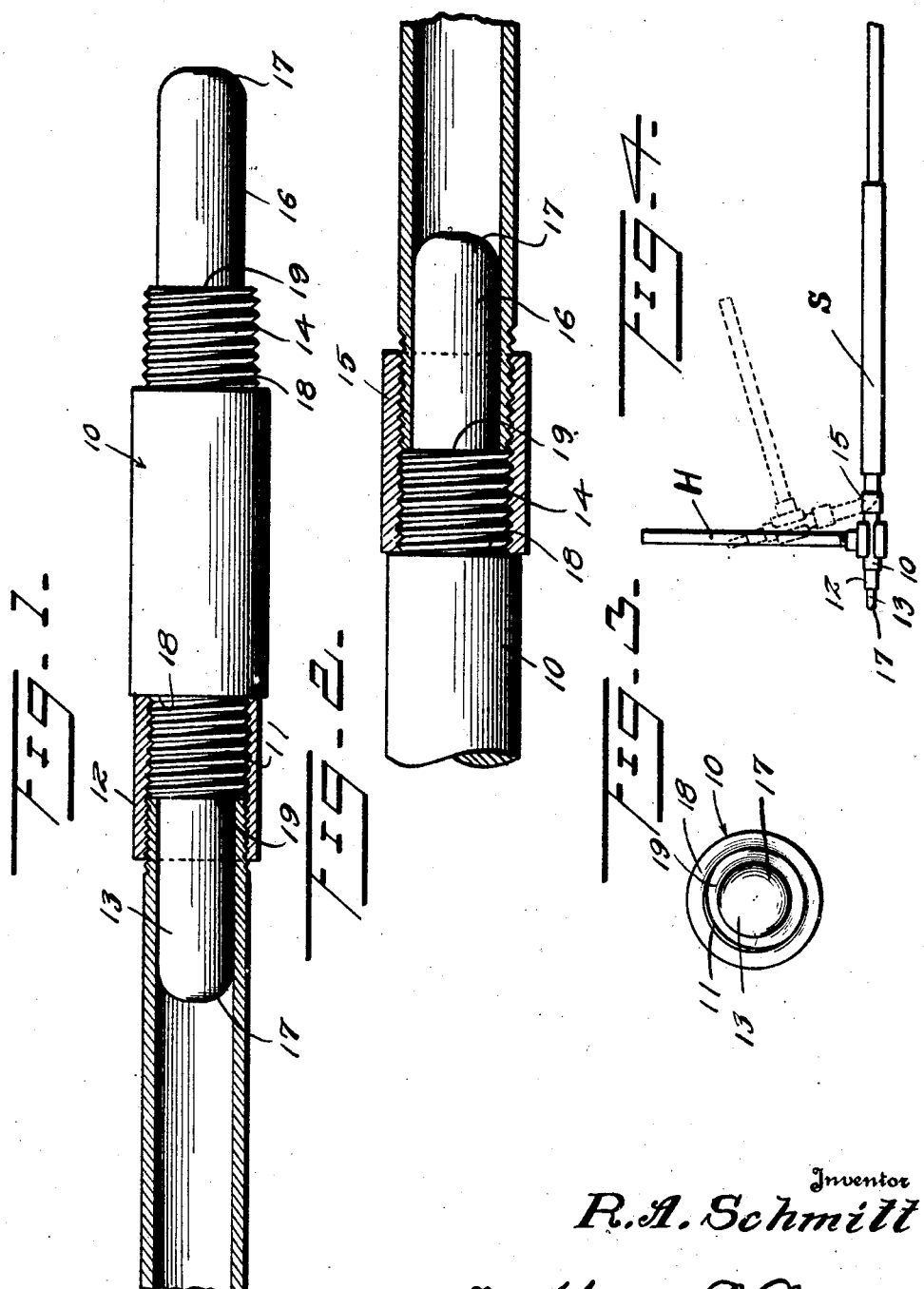

1,665,643

UNITED STATES PATENT OFFICE.

ROBERT A. SCHMITT, OF SAN DIEGO, CALIFORNIA.

NIPPLE CHUCK AND PIPE BENDER.

Application filed November 4, 1926. Serial No. 146,226.

This invention relates to a combined nipple chuck and pipe bender, and has for an important object thereof the provision of a simple and readily producible mandrel for holding pipe which is to be bent or pipe which is to be threaded for the formation of short or close nipples.

A further object of the invention is the provision of a device of this character which will be durable and efficient in operation and a general improvement in the art.

These and other objects I attain by the construction shown in the accompanying drawings, wherein for the purpose of illustration is shown a preferred embodiment of my invention and wherein:—

Figure 1 is a side elevation of a combined nipple chuck and pipe bender constructed in accordance with my invention showing the same connected with a pipe to form a bend therein;

Figure 2 is a fragmentary side elevation of the chuck showing a pipe engaged with the opposite end thereof;

Figure 3 is an end elevation of the chuck;

Figure 4 is a side elevation showing in solid lines the beginning of and in dotted lines the partial completion of the formation of a short bend by the use of an ordinary pipe hickey with the chuck.

Referring now more particularly to the drawings, the numeral 10 indicates a mandrel body of desired length having at one end thereof a reduced extension 11 for threaded engagement in a standard pipe coupling 12 of one size of pipe. From the end of the reduced extension 11, there is a projecting axial extension 13 which is of a size to fit within the pipe which is to be bent or threaded. At its opposite end, the body 10 has a second threaded extension 14 corresponding to the extension 11, but adapted for engagement with the coupling 15 of a larger size of pipe, and this extension 14 has an extension 16 to fit within this size of pipe. The free ends of the extensions 13 and 16 have their corners rounded, as indicated at 17, so that no damage will result to the pipe which is being bent thereon.

In the use of the device for bending pipe, the pipe to be bent is first provided with a coupling 12 or 15, and then placed upon the extension 13 with the coupling threaded upon the extension 11 or 14 until its end jams firmly against the shoulder 18 produced by the reduction of the body 10 to provide the extension. The pipe is in turn threaded into the coupling until it firmly abuts against the shoulder 19 produced by the formation of the extension 13 or 17. This renders the pipe very rigid to the extension 13 or 17 upon which it is mounted, and the bending or threading thereof may be readily accomplished.

For a bending operation, if desired, the other of the extensions 11 or 14 may be employed for attaching a section of pipe to the opposite end of the mandrel body to act as a lever. In threading, the mandrel body may be either secured in the usual bench vise or pipe vise or may be chucked in a threading machine. For ordinary bending operations and for very short bends, the chuck may be engaged by a hickey H of the type usually employed for pipe bending in electrical conduit installation. A sleeve S surrounding the pipe to be bent will prevent the extension of the bend beyond the desired point.

Thus, it will be obvious that the construction, as hereinbefore set forth, is capable of a certain range of change and modification without materially departing from the spirit of the invention and I accordingly do not limit myself to such specific structure except as hereinafter claimed.

I claim:—

A device for the purpose specified comprising a pipe coupling and a mandrel comprising a body one end of which is reduced to form a shoulder and having said reduced end threaded for engagement with said pipe coupling and of less length than the coupling to thereby permit engagement of one end of the coupling with the shoulder, said reduced end having an axial prolongation adapted to enter and interiorly fit throughout its length a pipe engaged with the coupling, said axial prolongation being reduced in size and thereby providing at its junction with the reduced extension a shoulder against which the end of the pipe may abut, said prolongation being of a length such that its end projects beyond the end of the coupling engaged with said reduced threaded portion to thereby support and prevent collapse of the pipe outwardly of said coupling, the extremity of said prolongation being rounded to thereby provide a guiding heel for use in producing short bends in pipe.

In testimony whereof I hereunto affix my signature.

ROBERT A. SCHMITT.